(12) United States Patent
Perkins (10) Patent No.: US 7,021,140 B2
(45) Date of Patent: Apr. 4, 2006

(54) ELECTRONIC MEASUREMENT OF THE MOTION OF A MOVING BODY OF SPORTS EQUIPMENT

(75) Inventor: Noel C. Perkins, 1845 Lanedowne, Ann Arbor, MI (US) 48106

(73) Assignee: Noel C. Perkins, Ann Arbor, MI (US)

( * ) Notice: Subject to any disclaimer, the term of this patent is extended or adjusted under 35 U.S.C. 154(b) by 0 days.

(21) Appl. No.: 10/201,806

(22) Filed: Jul. 24, 2002

(65) Prior Publication Data

US 2003/0024311 A1 Feb. 6, 2003

Related U.S. Application Data

(60) Provisional application No. 60/307,552, filed on Jul. 24, 2001.

(51) Int. Cl.
G01P 15/00 (2006.01)
G01P 1/00 (2006.01)
G01P 3/00 (2006.01)
A63B 69/00 (2006.01)

(52) U.S. Cl. .......................... 73/493; 73/495; 73/510; 73/511; 473/219; 473/407

(58) Field of Classification Search ................. 73/493, 73/491, 489, 495, 498, 499, 510, 511; 473/219, 473/221–226, 231–233, 256–258, 288–290, 473/307, 407, 409
See application file for complete search history.

(56) References Cited

U.S. PATENT DOCUMENTS

| | | | |
|---|---|---|---|
| 4,179,818 A * | 12/1979 | Craig | 33/321 |
| 4,276,711 A * | 7/1981 | Mathauser | 43/17 |
| 4,315,693 A * | 2/1982 | Walker | 356/470 |
| 5,182,873 A * | 2/1993 | Aragon, Jr. | 43/17 |
| 5,233,544 A | 8/1993 | Kobayashi | |
| 5,332,225 A | 7/1994 | Ura | |
| 5,447,305 A * | 9/1995 | Socci et al. | 473/458 |
| 5,542,672 A * | 8/1996 | Meredith | 463/37 |
| 5,792,000 A | 8/1998 | Weber et al. | |
| 5,833,156 A * | 11/1998 | Park et al. | 242/289 |
| 5,941,779 A * | 8/1999 | Zeiner-Gundersen | 473/224 |
| 6,045,364 A * | 4/2000 | Dugan et al. | 434/252 |
| 6,224,493 B1 | 5/2001 | Lee et al. | |

(Continued)

FOREIGN PATENT DOCUMENTS

JP 03121084 5/1991

(Continued)

Primary Examiner—Helen Kwok
(74) Attorney, Agent, or Firm—Young & Basile, P.C.

(57) ABSTRACT

An application of rate gyros and accelerometers allows electronic measurement of the motion of a rigid or semi-rigid body, such as a body associated with sporting equipment including a fly rod during casting, a baseball bat, a tennis racquet or a golf club during swinging. For instance, data can be collected by one gyro according to the present invention is extremely useful in analyzing the motion of a fly rod during fly casting instruction, and can also be used during the research, development and design phases of fly casting equipment including fly rods and fly lines. Similarly, data collected by three gyros and three accelerometers is extremely useful in analyzing the three dimensional motion of other sporting equipment such as baseball bats, tennis racquets and golf clubs. This data can be used to support instruction as well as design of the sporting equipment.

38 Claims, 4 Drawing Sheets

U.S. PATENT DOCUMENTS

| | | | | |
|---|---|---|---|---|
| 6,312,335 B1 * | 11/2001 | Tosaki et al. | ................ | 463/37 |
| 6,441,745 B1 * | 8/2002 | Gates | ................ | 340/669 |
| 6,584,722 B1 * | 7/2003 | Walls et al. | ................ | 43/4 |
| 6,607,450 B1 * | 8/2003 | Hackman | ................ | 473/223 |
| 2002/0123386 A1 * | 9/2002 | Perlmutter | ................ | 473/223 |

FOREIGN PATENT DOCUMENTS

| | | |
|---|---|---|
| JP | 04141186 | 5/1992 |
| WO | WO 00/69528 | 11/2000 |
| WO | WO 00/76311 A1 | 12/2000 |

* cited by examiner

FIG. 8

ELECTRONIC MEASUREMENT OF THE MOTION OF A MOVING BODY OF SPORTS EQUIPMENT

RELATED APPLICATIONS

This application claims the benefit of provisional application No. 60/307,552 which was filed on Jul. 24, 2001.

FIELD OF THE INVENTION

The invention relates to measuring parameters to define the motion of a rigid or semi-rigid body, where the electronic signals can be used to produce a three dimensional image of the rigid body moving in space, as well as specific features of motion capable of serving as a metric of performance such as acceleration, velocity, and position of the body in motion.

BACKGROUND OF THE INVENTION

There are no electronic devices that measure the motion of fly rod during flycasting. Measurements of fly rod motion have been performed using photographic methods including standard photography, time elapsed photography, and video. The Orvis Company uses high speed video photography as part of its fly fishing schools.

A major impediment to the sport of fly fishing is learning how to cast effectively with a fly rod. Proficient fly casters often learn through considerable practice and by instruction as provided in courses, books and videos on fly casting techniques. While fly casting instruction and techniques vary, they often stress the importance of understanding the mechanics of the fly line and the fly rod during casting.

SUMMARY OF THE INVENTION

The present invention provides students of fly casting and fly casting instructors with a diagnostic tool to measure the casting stroke. The device according to the present invention can pin point casting techniques and errors. A student can use this device to self-correct their casting stroke using either visual or audio feedback. An instructor can use this device to critically analyze a student's stroke and to identify points where improvement is needed. Additionally, a store selling fly fishing rods can measure the natural cast of a customer and use this measurement to help select an appropriate type of fly rod.

The present invention was originally motivated by the sport of fly fishing. However, devices according to the present invention can be used for training in many other sports including golf, tennis and baseball. In each of these sports, the equipment (club, racquet, bat) could be instrumented with a small and lightweight (e.g., Micro Electro Mechanical Systems (MEMS)) three-axis accelerometer and three-axis rate gyro. This pair of devices, accelerometer and rate gyro, would provide the necessary information to define the motion of the rigid body (club, racquet, bat) in space. Thus, the electronic signals could be used to produce a three dimensional image of the rigid body as it moves in space as well as specific features of this motion that may serve as metrics of performance (e.g., specific acceleration, velocity, and position measures). As in fly casting instruction, instruction in these other sports may profit from the ready analysis made possible through this instrumentation.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
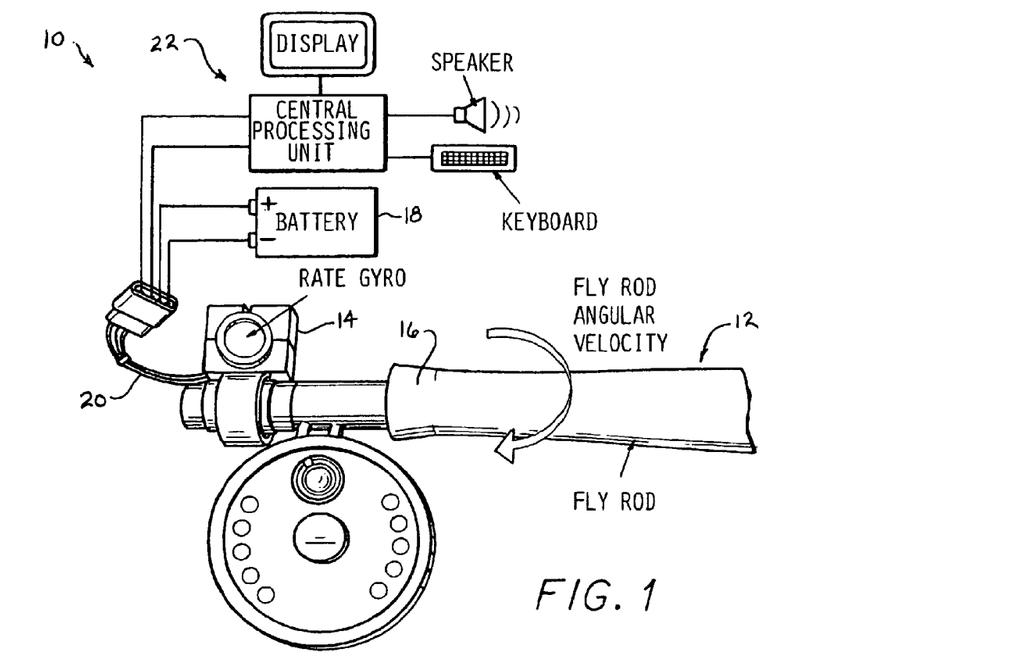
FIG. 1 is a schematic diagram showing a rate gyro housed in a plastic fixture that is attached to a rigid or semi-rigid body, such as the reel seat of a fly rod, with a wiring harness used to connect the device to a computer A/D board and a suitable battery power supply.

The present invention discloses a device 10 representing a new and simple means for electronically measuring the motion of a rigid or semi-rigid body 12, such as a fly rod, bat, racquet, club, or the like. The device, by way of example and not limitation is illustrated in FIG. 1 ,includes a small, single-axle rate gyro 14 mounted to a reel seat of a fly rod 16. The rate gyro shown here is commercially available and is representative of many types of gyros that can be used for this function. In particular, newer micro electro mechanical systems (MEMS) rate gyros can also be employed with potentially reduced weight as well as cost. The example (illustrated) gyro is powered by a 9 volt transistor battery 18 through the wiring harness 20 that is labeled. The wiring harness is also used to draw the analog signal from the gyro. The analog signal is subsequently collected on a computer 22 through a standard analog/digital (A/D) board and data acquisition software. As the body, such as a rod is being moved or cast, the angular velocity measured at the reel seat is detected by the rate gyro. The rate gyro outputs an analog voltage proportional to the angular velocity. The axis of the gyro is oriented so that the gyro measures the angular-velocity component perpendicular to the plane of the rod formed while casting. This single angular velocity component represents the dominant motion of the fly rod as controlled by the caster. The caster can also create additional translation of the butt end of the fly rod, but this contribution to the overall motion of the rod is far smaller than the intended rotation measured by the rate gyro. Moreover, this additional translation can be measured with the addition of a two (or even three) axis accelerometer.

The output of the device according to the present invention can take several forms to promote the analysis of the moving body, such as fly casting, fly casting instruction methods, and fly casting equipment selection and design. Two readily identifiable forms are visual, and audio output. Visual output includes displaying information about the body motion, such as fly rod motion for the purpose of viewing the casting signature of a particular fly caster. By way of example and not limitation, visual output can include plots of the angular velocity, angular position (obtained by integrating the angular velocity signal), angular acceleration (obtained by differentiating the angular velocity signal), and animating the motion of the body through software. From these visual cues, one can observe the major features of the motion, such as casting strokes as discussed in the examples that follow. After casting is completed, a caster can review his/her casting signature, study weak points and then improve his/her casting ability. Audio output represents an attractive alternative to visual output in that audio output can be used as feedback during casting rather than after casting is completed. For instance, the output of the rate gyro could be used to create an audible speedometer that outputs tones in proportion to the angular velocity. This could be achieved by creating a frequency modulated (FM) signal from the output of the rate gyro. Feeding these tone back to the caster through an earplug speaker would allow the caster to listen to his/her casting signature and to make adjustments to these strokes during casting. For instance, a student's casting signature can be electronically compared to that of an expert and the resulting error signal, when converted to audio form, can allow the student to listen to and then lock onto the expert's casting stroke. A combination of visual and audio output can provide means for deeply analyzing the fly casting signature after casting and then polishing this signature during casting.

Figure 2:
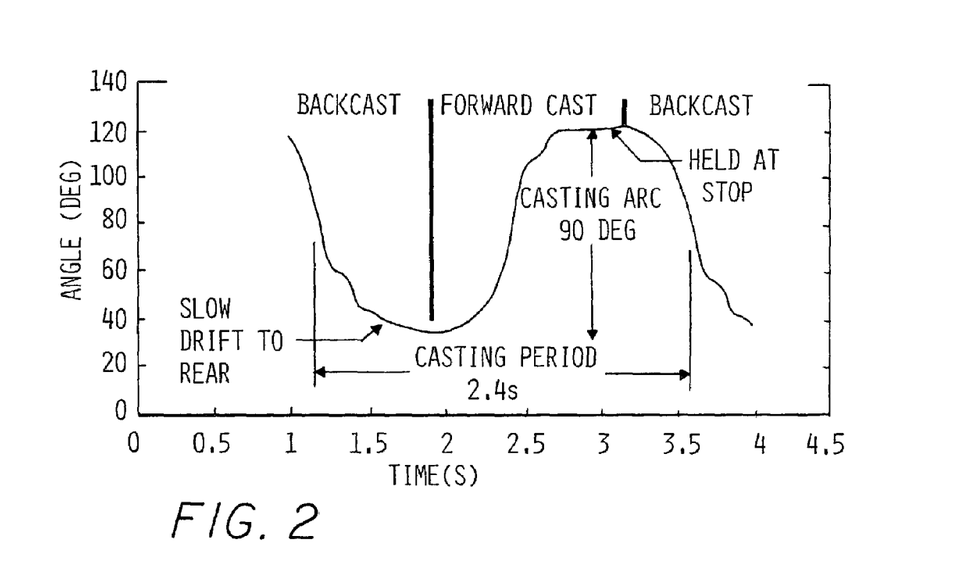
FIG. 2 is a graph illustrating angular position of a butt section in degree as a function of time in seconds during an overhead cast having a length of 43 feet.
Figure 3:
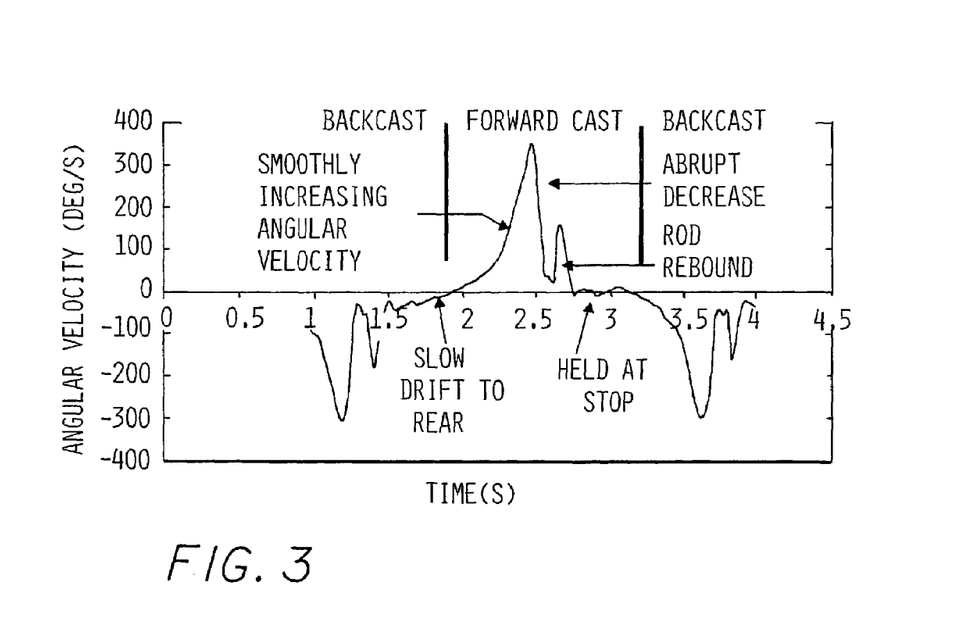
FIG. 3 is a graph illustrating angular velocity in degrees per second of butt section as a function of time in seconds during an overhead cast of length 43 feet.

A working prototype has been developed as depicted in FIG. 1 and used to obtain example results illustrated in FIGS. 2 and 3. These results are for a standard overhead cast of 43 feet as made by an expert caster. FIGS. 2 and 3 illustrate, first, the angular position of the reel seat during the cast, and second, the angular velocity of the reel seat. These two quantities are plotted over a 3 second sampling interval with a sampling frequency of 80 Hz. It should be recognized that a similar device with corresponding results can be produced according to the present invention for use with any rigid or semi-rigid body having a defined or desirable motion associated therewith, such as any other sporting equipment including a bat, racquet, club, or the like.

FIG. 2 shows the angular position of the butt section of the fly rod (in degrees) as a function of time (in seconds) for one and a half false casting cycles. Two backcasts and one forward cast are plotted. Notice that the angular position varies smoothly with time. It is also periodic with a casting period of approximately 2.4 seconds, and with a casting arc of approximately 90 degrees as noted in this figure. There is a well-defined stop at the end of the forward cast where the angle is held constant at this stop for approximately one half second. The stop of the backcast is more gradual and exhibits a slow drift to the rear just before the start of the forward cast. This slow drift is probably intentional in that it allows the caster to increase the casting arc for the upcoming forward cast.

The associated angular velocity for this same cast is illustrated in FIG. 3. This is the quantity that is directly measured by the rate gyro and is plotted in the units of degrees per second. The angular velocity is noticeably less smooth than the angular position yet it remains periodic (with the casting period of 2.4 seconds as required). Positive values of the angular velocity represent a rod motion towards the forward direction and therefore these values define the forward casting phase. Similarly, the backcasting phase is defined by negative (rearward) angular velocity. Notice the great overall similarity (symmetry) of the forward cast and the back casts. The maximum angular velocity of the forward cast is 355 degrees per second (deg/s) while the maximum magnitude of the angular velocity of the backcast is 300 deg/s. The difference (55 deg/s) represents only a 15% departure from perfect symmetry. Notice that the first backcast ends with a slow drift to the rear (small negative angular velocity) and this leads to the "rounded profile" seen in FIG. 2 in this same region. The forward cast is created by a smooth application of power that leads to a smooth yet rapid increase in the angular velocity from 0 deg/s to the maximum of 355 deg/s. After this peak, the rod is suddenly decelerated and there is an abrupt decrease in the angular velocity nearly to zero. This decrease is interrupted by the vibration of the rod as it rebounds (unloads). The rebound of the rod tip is transmitted to the butt section where it is ultimately felt by the caster and causes an unwanted additional rotation of the butt section. Following this rebound, the rod is held at a well defined stop (zero angular velocity) for a period of approximately one half second before the next backcast begins. Note that the unloading of the backcast again generates a rebound of the rod (now rebounding in the opposite direction as expected) and that the magnitude of this rebound is nearly the same as for the forward cast. This suggests that the back cast and forward casts load the rod approximately equal amounts and that both have well defined stops leading to the observed rebound.

Fly rod motion can be measured photographically. The video equipment necessary for photographic measurements is expensive to purchase and operate. The rod motion can then be viewed after casting. Advantages of measuring the rod motion electronically include the immediate feedback to the caster (e.g., through audio output) as well as potentially less cost when compared to highspeed video used in some casting schools such as those offered by Orvis.

Accelerometers can also be used in lieu of a rate gyro to electronically measure the motion of a fly rod. A pair of accelerometers placed a measured distance apart near the reel seat can be used to measure the angular acceleration of the rod at the reel seat. Integration of this signal could then reproduce the angular velocity and angular position of the rod at the reel seat as with the rate gyro. Accelerometers can also be used in conjunction with a rate gyro to measure the translation of the rod in addition to the rotation measured by the gyro. Additional rate gyros and accelerometers can be employed to measure three-dimensional motions as in the case of a baseball bat, tennis racquet, and golf club. At a minimum, six measuring devices (e.g. three single axis rate gyros and three single axis accelerometers) are required to determine the six degrees of freedom of the rigid (or semi-rigid) body in three-dimensional space.

Figure 4:
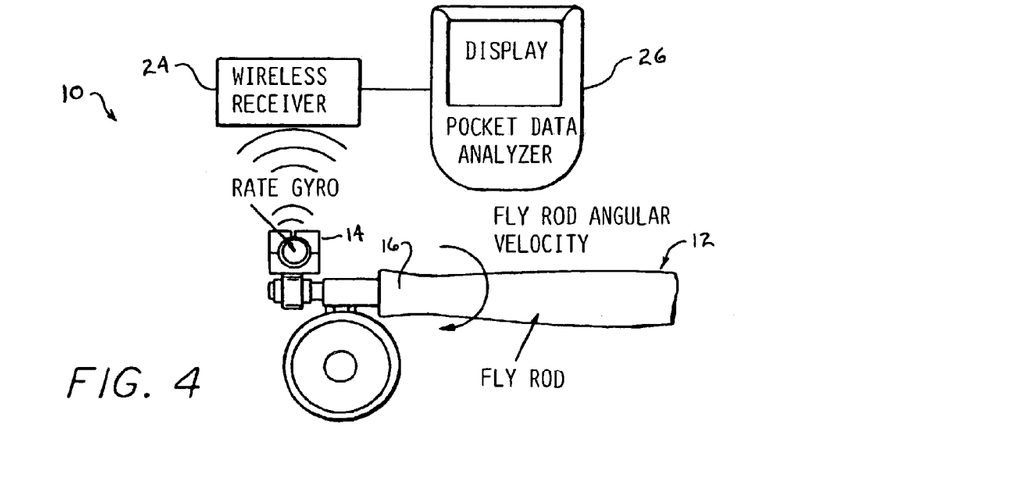
FIG. 4 is a schematic diagram showing a flycasting analyzer using a micro-electro mechanical system rate gyro with wireless communication to a hand held data acquisition unit.

Referring now to FIG. 4, the present invention can include a wireless data transfer between the instrumentation module and the data analyzer and/or display. As illustrated in FIG.

4, the output of the device according to the present invention can provide analysis of the moving body 12, such as flycasting. The device 10, by way of example and not limitation, includes a single, single-axle rate gyro 14 mounted to a reel seat of a fly rod 16. Appropriate rate gyros are commercially available. The rate gyro can be powered by a suitable power supply. Data corresponding to the signal from the gyro can be transmitted to a wireless receiver 24. The wireless receiver is connectible to a pocket data analyzer 26. The pocket data analyzer can display plots corresponding to the measured characteristics, such as angular velocity, angular position, angular acceleration, and animated motion of the moving body through the use of appropriate software. The analog signal from a commercially available gyro can be collected though a standard analog/digital (A/D) board and data acquisition software. The analog/digital conversion can occur either prior to transmission or after receiving the wireless signal. As the body is moved, the angular velocity measured at the reel seat is detected by the rate gyro. The gyro outputs an analog voltage proportional to the angular velocity. The axis of the gyro is oriented so that the gyro measures the angular velocity component perpendicular to the plane of the rod formed while casting. This single angular velocity component represents the dominant motion of the fly rod as controlled by the caster. The caster can also create additional translation of the butt end of the fly rod, but this contribution to theoverall motion of the rod is far smaller than the intended rotatio measured by the rate gyro. Moreover, the additional translation can be measured if desired with the addition of a two axis, or three axis, accelerometer.

The present invention is applicable to a wide variety of sports including golf, tennis, and baseball in addition to the flycasting example given. Depending on the sports equipment to be measured and analyzed while in motion, the instrumentation module according to the present invention can contain multiple sensors for proper transduction of two dimensional through three dimensional rigid body dynamics. The signals measured by the one or more sensors can be transmitted through wires and/or wireless technology for processing by the data analyzer unit. The data collection according to the present invention can be accomplished via a computer (e.g., a desktop computer, or a laptop computer), or by a hand-held device (e.g. personal digital assistant(PDA)).

Figure 5:
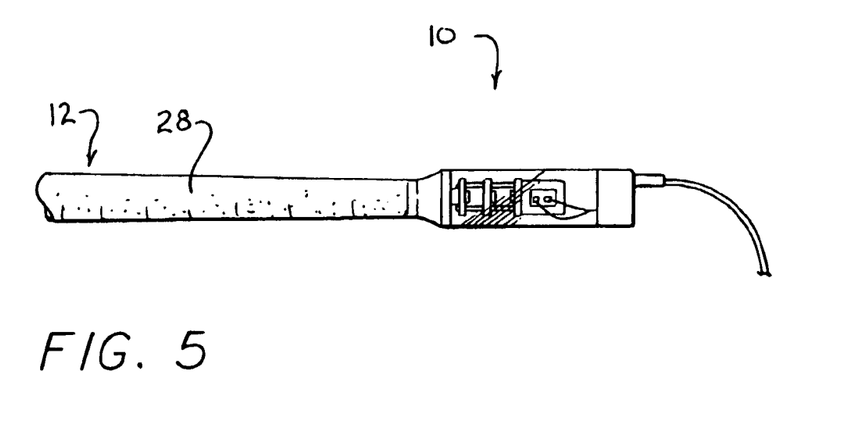
FIG. 5 is a schematic diagram showing an attachable instrumentation module for clamping to the end of the grip of a golf club containing three micro-electro mechanical system rate gyros with sense axes mutually orthogonal with respect to one another and three micro-electro mechanical system accelerometers with sense axes mutually orthogonal with respect to one another.
Figure 6:
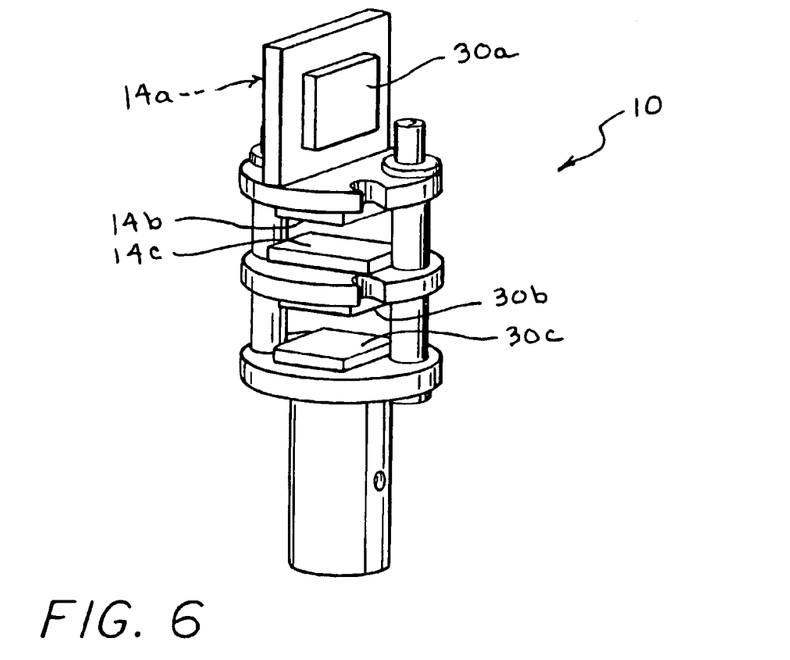
FIG. 6 is a perspective view of the instrumentation sensor module of FIG. 4 illustrating a possible configuration for individual accelerometers and rate gyros with sense axes in three mutually orthogonal directions.
Figure 7:
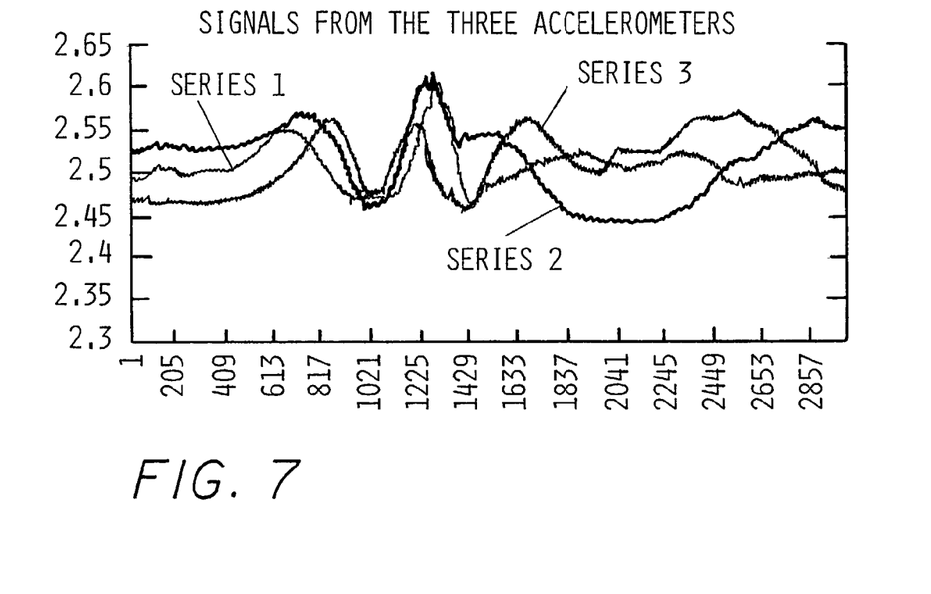
FIG. 7 is a graph illustrating signals from the three accelerometers during a swing of the golf club.
Figure 8:
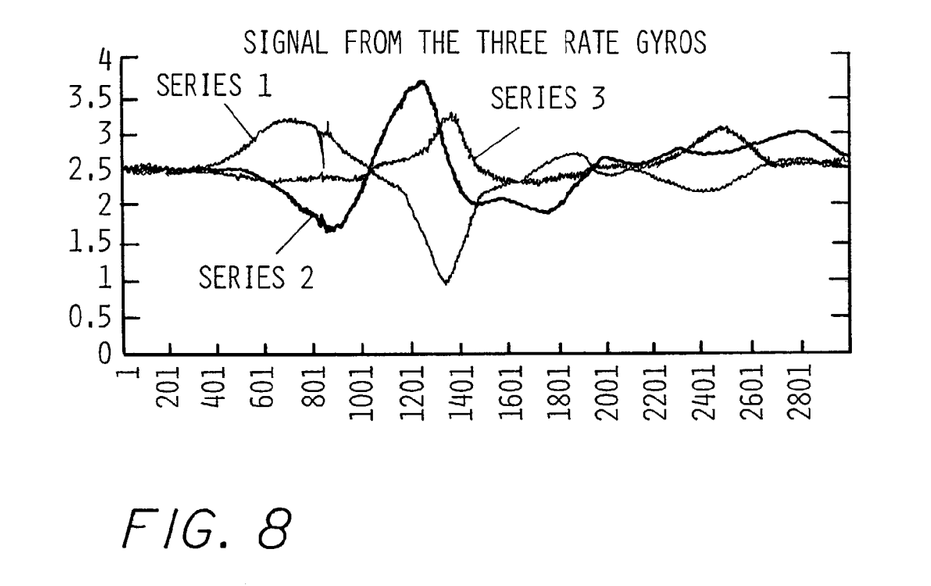
FIG. 8 is a graph of the signals from the three rate gyros during a swing of the golf club.

Referring now to FIGS. 5 through 8, the instrumentation module 10 according to the present invention can be used in combination with a standard golf club 28. As best seen in FIGS. 5 and 6, the instrumentation module can be configured for clamping attachment to an end of a standard grip of a standard golf club. In this instance, the instrumentation module preferably contains three micro-electro mechanical system rate gyros 14a, 14b, 14c with sense axes mutually orthogonal with respect to one another, and three micro-electro mechanical system accelerometers 30a, 30b, 30c with sense axes mutually orthogonal with respect to one another in order to capture the motion of three dimensional rigid, or semi-rigid, body dynamics of the golf club. By way of illustration and not limitation, one possible configuration of the individual accelerometers and rate gyros is illustrated schematically in FIG. 6. Each sense axis of the three rate gyros is mutually orthogonal with respect to the other rate gyros providing measurement with respect to an X-Y-Z coordinate system. Each sense axis of the three accelerometers are mutually orthogonal with respect to the other accelerometers, and preferably correspond to the same X-Y-Z coordinate axis system as the rate gyros. Referring now to FIG. 7 example signals obtained from the three accelerometers connected to the end of a golf club with the instrumentation module shown in FIGS. 5 and 6 according to the present invention are illustrated. FIG. 8 illustrates example signals from the three rate gyros during a swing of a golf club with the instrumentation module illustrated in FIGS. in 5 and 6 attached to the end of a standard grip of the standard golf club.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed:

1. An apparatus for analyzing movement of an elongate body of sporting equipment comprising:
   electronic means, releasibly connectible to and associated with the body, for continuously measuring six rigid body degrees of freedom corresponding to motion of the body over time; and
   means for powering the electronic means, wherein the electronic means includes at least one angular rate gyro for generating an analog signal corresponding to movement of the body.

2. The apparatus of claim 1 wherein the at least one gyro further comprises:
   a single-axis angular rate gyro.

3. The apparatus of claim 1 wherein the at least one gyro further comprises:
   a micro electro mechanical system angular rate gyro for generating an analog signal corresponding to movement of the body over time.

4. The apparatus of claim 1 wherein the electronic means further comprises:
   at least one angular rate gyro for generating a first signal corresponding to movement of the body; and
   at least one accelerometer for generating a second signal corresponding to movement of the body.

5. An apparatus for analyzing movement of an elongate body of sporting equipment comprising:
   electronic means, associated with the body, for continuously measuring six degrees of freedom corresponding to motion of the body over time, wherein the electronic means includes at least one angular rate gyro for generating a first signal corresponding to movement of the body, and at least one accelerometer for generating a second signal corresponding to movement of the body, the at least one gyro including three angular rate gyros, each gyro positioned with a sensing axis perpendicular with respect to sensing axes of the other gyros, and the at least one accelerometer including three accelerometers, each accelerometer positioned with a sensing axis perpendicular to sensing axes of the other accelerometers; and
   means for powering the electronic means.

6. The apparatus of claim 1 wherein the powering means further comprises:
   a battery connectible to the electronic means.

7. The apparatus of claim 1 further comprising:
   the electronic means for generating a signal corresponding to movement of the body over time; and central processing means for processing the signal corresponding to movement of the body over time in accordance with a program stored in memory.

8. The apparatus of claim 7 further comprising:
means for transmitting a data signal from the electronic means to the central processing means.

9. The apparatus of claim 8 wherein the transmitting means further comprises an electrical signal transferred through wires connecting the electronic means to the central processing means.

10. The apparatus of claim 8 wherein the transmitting means further comprises a wireless signal transferred through the electronic means to a receiver for delivery to the central processing means.

11. The apparatus of claim 7 further comprising:
the central processing means for generating an output signal.

12. The apparatus of claim 11 wherein the output signal is an audio signal corresponding to a variance between a comparison of the signal corresponding to movement of the body over time with a predetermined signal.

13. The apparatus of claim 11 wherein the output signal is visual signal corresponding to a graphic display of the signal corresponding to movement of the body over time.

14. The apparatus of claim 13 wherein the graphic display compares the signal corresponding to movement of the body over time with a predetermined signal.

15. The apparatus of claim 1 further comprising:
a mounting bracket for connecting the electronic means to a body corresponding to a standard piece of sporting equipment.

16. An apparatus for analyzing movement of an elongate body of sporting equipment comprising:
electronic means, located in a housing separate from the body and removably associated with the body, for continuously measuring at least one parameter corresponding to an angular rate of motion of the body over time; and
means for powering the electronic means, wherein the body is a fly rod having en attached fly reel and fly line for performing an actual fly casting stroke.

17. The apparatus of claim 16 wherein the electronic means generates a signal corresponding to an angular rate of motion of the fly rod during an actual fly casting stroke.

18. The apparatus of claim 16 further comprising:
the electronic means connectible to a reel seat of the fly rod for measuring angular velocity perpendicular to a plane of the fly rod formed while casting and for generating an analog voltage proportional to the measured angular velocity.

19. A method for analyzing movement of an elongate body of sporting equipment comprising steps of:
continuously measuring six rigid body degrees of freedom corresponding to motion of the body over time with an electronic means, releasibly connectible to and associated with the body, wherein the measuring step includes the step of generating an analog signal corresponding to movement of the body with at least one angular rate gyro; and
powering the electronic means.

20. The method of claim 19 wherein the at least one gyro further comprises:
a single-axis angular rate gyro.

21. The method of claim 19 wherein the at least one gyro further comprises:
a micro electro mechanical system angular rate gyro for generating an analog signal corresponding to movement of the body over time.

22. The method of claim 19 wherein the measuring step further comprises the steps of:
generating a first signal corresponding to movement of the body with at least one angular rate gyro; and
generating a second signal corresponding to movement of the body with at least one accelerometer.

23. A method for analyzing movement of an elongate body of sporting equipment comprising the steps of:
continuously measuring six degrees of freedom corresponding to motion of the body over time with an electronic means, associated with the body, wherein the measuring step further includes the steps of generating a first signal corresponding to movement of the body with at least one angular rate gyro, and generating a second signal corresponding to movement of the body with at least one accelerometer, the at least one gyro including three angular rate gyros, positioning each gyro with a sensing axis perpandicular with respect to sensing axes of the other gyros, and the at least one accelerometer including three accelerometers, positioning each accelerometer with a sensing axis perpandicular to sensing axes of the other accelerometers.

24. The method of claim 19 wherein the powering step further comprises the step of:
connecting a battery to the electronic means.

25. The method of claim 19 further comprising the step of:
generating a signal corresponding to movement of the body over time with at least one gyro;
processing the signal corresponding to movement of the body over time in accordance with a program stored in memory with a central processing means.

26. The method of claim 25 further comprising:
transmitting a data signal from the electronic means to the central processing means.

27. The method of claim 26 wherein the transmitting step further comprises an electrical signal transferred through wires connecting the electronic means to the central processing means.

28. The method of claim 26 wherein the transmitting step further comprises a wireless signal transferred through the electronic means to a receiver for delivery to the central processing means.

29. The method of claim 25 further comprising the step of:
generating an output signal with the central processing means.

30. The method of claim 29 wherein the output signal is an audio signal corresponding to a variance between a comparison of the signal corresponding to movement of the body over time with a predetermined signal.

31. The method of claim 29 wherein the output signal is visual signal corresponding to a graphic display of the signal corresponding to movement of the body over time.

32. The method of claim 31 wherein the graphic display compares the signal corresponding to movement of the body over time with a predetermined signal.

33. The method of claim 19 further comprising the step of:
connecting the electronic means to a body corresponding to a standard piece of sporting equipment with a mounting bracket.

34. A method for analyzing movement of an elongate body of sporting equipment comprising the steps of:

continuously measuring at least one parameter corresponding to an angular rate of motion of to body over time with an electronic means located in a housing separate from the body and removably associated with the body; and powering the electronic means, wherein the body is a fly rod having an attached fly reel and fly line performing an actual fly casting stroke.

35. The method of claim 34 wherein the electronic means generates a signal corresponding to an angular rate of motion of the fly rod during an actual fly casting stroke.

36. The method of claim 34 further comprising the step of:

connecting the electronic means to a reel seat of the fly rod for measuring angular velocity perpendicular to a plane of the fly rod formed while casting and for generating an analog voltage proportional to the measured angular velocity.

37. The apparatus of claim 1 further comprising:

a housing enclosing at least a portion of the electronic means, the housing separate from the body and removably associated with the body.

38. The method of claim 19 further comprising the step of:

enclosing at least a portion of the electronic means in a housing, the housing separate from the body and removably associated with the body.

* * * * *

UNITED STATES PATENT AND TRADEMARK OFFICE
CERTIFICATE OF CORRECTION

| | | |
|---|---|---|
| PATENT NO. | : 7,021,140 B2 | Page 1 of 1 |
| APPLICATION NO. | : 10/201806 | |
| DATED | : April 4, 2006 | |
| INVENTOR(S) | : Noel C. Perkins | |

It is certified that error appears in the above-identified patent and that said Letters Patent is hereby corrected as shown below:

On first page of Patent under Assignee:
"Noel C. Perkins" should read --The Regents of the University of Michigan--

Signed and Sealed this

Eighteenth Day of July, 2006

JON W. DUDAS
*Director of the United States Patent and Trademark Office*